W. H. ROTHROCK.
ANTISKID DEVICE.
APPLICATION FILED MAY 2, 1919.
1,318,597.
Patented Oct. 14, 1919.
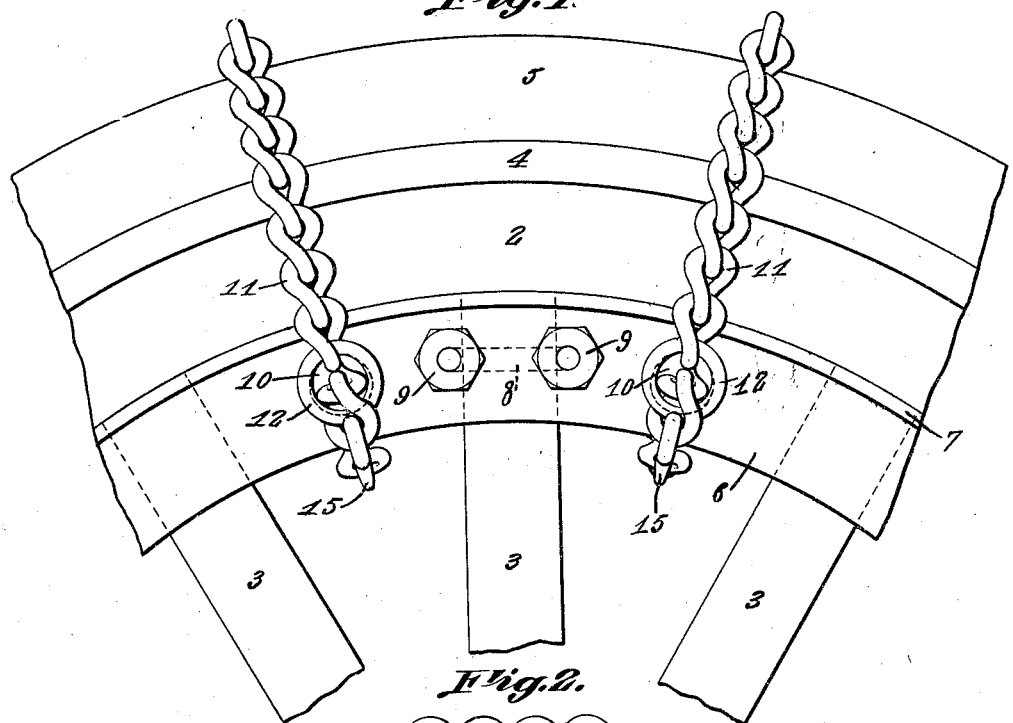
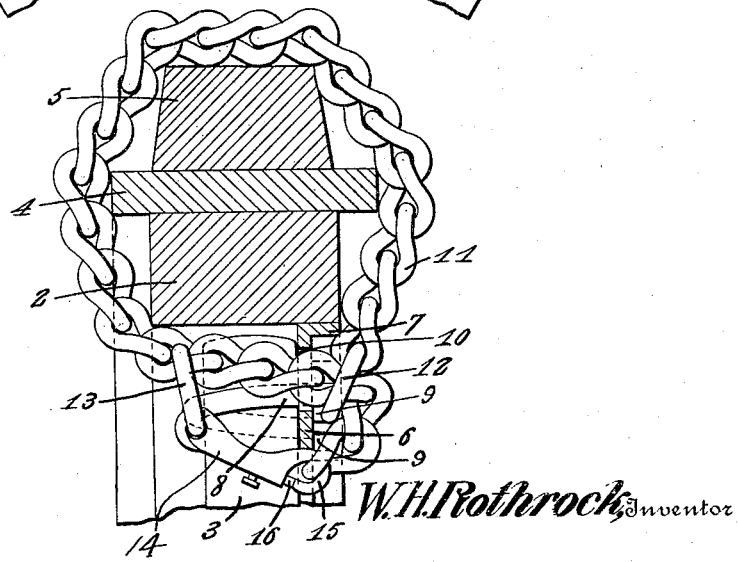
W. H. Rothrock, Inventor

UNITED STATES PATENT OFFICE.

WILLIAM H. ROTHROCK, OF ALLENTOWN, PENNSYLVANIA.

ANTISKID DEVICE.

1,318,597.

Specification of Letters Patent.

Patented Oct. 14, 1919.

Application filed May 2, 1919. Serial No. 294,296.

*To all whom it may concern:*

Be it known that I, WILLIAM H. ROTHROCK, a citizen of the United States, residing at Allentown, in the county of Lehigh and State of Pennsylvania, have invented a new and useful Antiskid Device, of which the following is a specification.

This invention relates to improvements in antiskid devices for the wheels of automobiles and other vehicles, the object of the invention being to provide an improved device of this character that can be applied to the tire in a variety of different positions so as to present a different wearing surface whenever desired and which is securely locked to the wheel in such a manner that the annoyance that is sometimes caused by the chains striking against the mudguards or other parts of the vehicle is entirely avoided.

With the foregoing and other objects in view, which will appear as the description proceeds, the invention consists in the novel features of construction and combination of parts which will be more fully described hereinafter and particularly pointed out in the claim.

In the drawings accompanying and forming part of this specification,

Figure 1 is a side elevation of so much of a wheel as is necessary to illustrate the manner in which my improved antiskid device is applied thereto; and Fig. 2 is a sectional view through a tire and rim, showing an antiskid device, constructed in accordance with the present invention, applied thereto.

The same characters of reference designate the same parts in the different figures of the drawings.

Referring to the drawings, 2 designates the felly of a wheel, 3 the spokes, 4 the rim, and 5 the tire, all of which are of usual construction. The present improvement comprises an annular member or ring 6 of L-shape in cross section and having an exterior diameter of sufficient size to permit it to fit within the wheel with its flange 7 in contact with the inner side of the felly. This ring is secured to a plurality, preferably three, of the spokes at equal distances apart, by means of U-bolts 8 and nuts 9. The ring 6 is provided with a plurality of openings 10 at equal distances apart and preferably so spaced that an opening comes approximately midway between the spokes all around the wheel. A plurality of chains 11 are provided, each having at one end thereof an enlarged ring 12 and with a second enlarged ring 13 secured to a link at some distance from the opposite end of the chain. The ring 13 carries a locking member 14 having a hooked end 15 adapted to engage any link of the chain and a spring-pressed pin 16 which projects into contact with the hook and prevents the hook from becoming disengaged from the link of the chain.

The ring member 6 is secured to the spokes of the wheel in the manner described and the chains passed around the felly and tire of the wheel in the usual manner. The end of the chain opposite from the end carrying the ring 12 is passed through the opening in the annular member 6 and then through the ring 12. The hook of the locking member is then engaged with one of the links of the chain in a manner that will be readily understood. It will thus be seen that I have provided an antiskid device in which the chain can be turned inside out after becoming worn on one side, and in which it is possible to lengthen or shorten the chain as desired, by merely engaging the hook member with a different link. By the use of this device the chain may be fastened so that it will not be loose enough to strike the mudguard or any other part of the automobile.

While I have described in detail the structure herein illustrated, it is to be understood that I do not thereby limit my invention to the precise features of construction shown, as I am aware that many mechanical changes and modifications may be made therein without departing from the spirit and scope of the invention as set forth in the claim appended hereto.

Having thus described my invention, what I claim is:

In combination with a wheel, and the felly thereof, an apertured ring, having a flange engaging the inner surface of the felly, a chain having a ring formed at one end thereof, said chain adapted to embrace a portion of the wheel, one end of said chain adapted to pass through one of the apertures of the ring, and through the ring on one end of the chain, and a locking member connected to the chain in spaced relation with the end carrying the same, said locking member adapted to engage predetermined link members of the chain, for securing the chain to the wheel.

In testimony that I claim the foregoing as my own, I have hereto affixed my signature in the presence of two witnesses.

WILLIAM H. ROTHROCK.

Witnesses.
 JOHN C. HILLS,
 O. C. GRIESEMER.

Copies of this patent may be obtained for five cents each, by addressing the "Commissioner of Patents, Washington, D. C."